United States Patent
Colineau et al.

(10) Patent No.: US 10,161,522 B2
(45) Date of Patent: Dec. 25, 2018

(54) SEALING RING

(71) Applicants: Francois Colineau, Weinheim (DE);
 Guenter Hintenlang, Abtsteinach (DE);
 Thomas Klenk, Dossenheim (DE)

(72) Inventors: Francois Colineau, Weinheim (DE);
 Guenter Hintenlang, Abtsteinach (DE);
 Thomas Klenk, Dossenheim (DE)

(73) Assignee: Carl Freudenberg KG, Weinheim (DE)

( * ) Notice: Subject to any disclaimer, the term of this patent is extended or adjusted under 35 U.S.C. 154(b) by 715 days.

(21) Appl. No.: 13/973,329

(22) Filed: Aug. 22, 2013

(65) Prior Publication Data
 US 2014/0203514 A1 Jul. 24, 2014

(30) Foreign Application Priority Data

Jan. 22, 2013 (DE) .......... 10 2013 000 982

(51) Int. Cl.
 *F16J 15/02* (2006.01)
 *F16J 15/00* (2006.01)
 *F16J 15/06* (2006.01)
 *F16J 15/3232* (2016.01)

(52) U.S. Cl.
 CPC .......... *F16J 15/002* (2013.01); *F16J 15/064* (2013.01); *F16J 15/3232* (2013.01)

(58) Field of Classification Search
 CPC .......... F16J 15/16; F16J 15/32; F16J 15/3204; F16J 15/3232
 See application file for complete search history.

(56) References Cited

U.S. PATENT DOCUMENTS

| | | | | |
|---|---|---|---|---|
| 6,109,794 A * | 8/2000 | Bertetti et al. | ................ | 384/462 |
| 6,517,612 B1 * | 2/2003 | Crouch et al. | .................. | 95/277 |
| 6,702,294 B2 * | 3/2004 | Sassi | .............. | 277/572 |
| 6,736,403 B2 * | 5/2004 | Kreutzer | ....................... | 277/551 |
| 7,674,044 B2 * | 3/2010 | Matsui | .............. | 384/486 |
| 7,828,300 B2 * | 11/2010 | Munekata | ..................... | 277/559 |
| 2004/0232620 A1 * | 11/2004 | Bock et al. | .................. | 277/320 |
| 2006/0290070 A1 * | 12/2006 | Park | .............................. | 277/559 |
| 2010/0052263 A1 | 3/2010 | Doane | | |
| 2012/0299251 A1 | 11/2012 | Ogishi et al. | | |

FOREIGN PATENT DOCUMENTS

| | | |
|---|---|---|
| DE | 10293217 T5 | 4/2004 |
| DE | 10314924 A1 | 11/2004 |
| DE | 10340802 A1 | 4/2005 |
| WO | WO 2009072606 A1 * | 6/2009 |

* cited by examiner

*Primary Examiner* — Vishal A Patel
(74) *Attorney, Agent, or Firm* — Daniel J. Sepanik, Esq.; Harness, Dickey & Pierce, P.L.C.

(57) ABSTRACT

A seal assembly having a sealing ring, including at least one dynamically stressed sealing lip (1) and a buffer seal (2), which is arranged adjacent to the sealing lip (1) at an axial distance (3) therefrom, wherein the buffer seal (2) is made of an electrically conductive material, and wherein the sealing lip (1) and the buffer seal (2) are adjacent to and in contact with a surface (5) to be sealed of a first machine element (6) to be sealed, wherein the first machine element (6) to be sealed is arranged adjacent to a second machine element (8) at a radial distance (7) therefrom, wherein the sealing ring (1) is arranged in the a gap (9) formed by the radial distance (7), wherein the first (6) and second machine elements (8) are in contact with the buffer seal (2) in an electrically conductive manner.

6 Claims, 2 Drawing Sheets

SEALING RING

CROSS-REFERENCE TO RELATED APPLICATIONS

Figure 1:
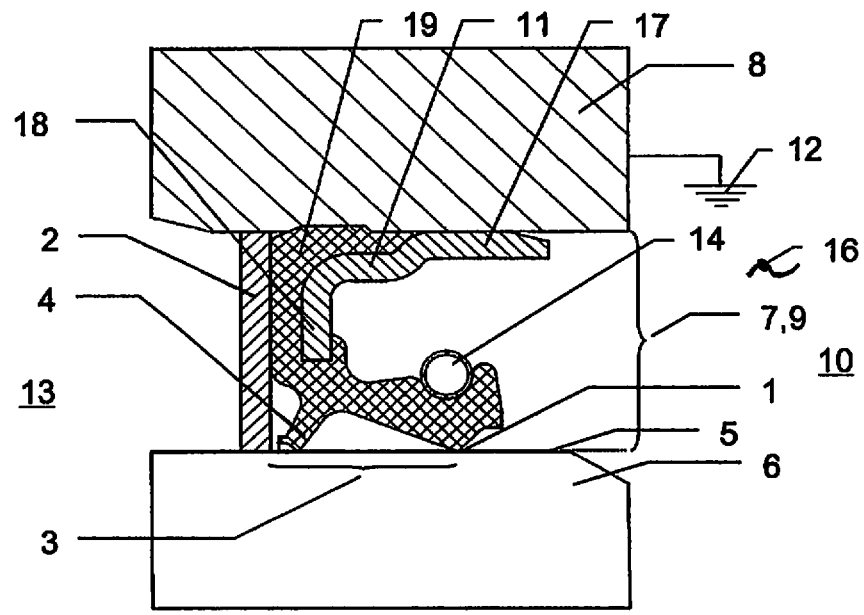

This application claims the benefit and priority of German Application No. 10 2013 000 982.0, filed Jan. 22, 2013. The entire disclosure of the above application is incorporated herein by reference.

FIELD

The present disclosure relates to a sealing ring made of a rubbery elastic material and to a sealing ring comprising at least one dynamically stressed sealing lip and a buffer seal, arranged adjacent to the sealing lip and spaced axially from the lip.

The present disclosure further relates to a seal assembly comprising such sealing rings.

BACKGROUND

Sealing rings of this type and a seal assembly of this type comprising such a sealing ring are generally known in the art. The sealing ring can be embodied as a radial shaft sealing ring, wherein the sealing lip faces the medium to be sealed in an axial direction. The buffer seal faces the surrounding environment in an axial direction. The problem addressed by the buffer seal is that of preventing contaminants from the environment from penetrating to the sealing lip. This results in better performance properties of the sealing ring over a longer service life.

SUMMARY

The problem addressed by the present disclosure is that of further developing sealing rings and a seal assembly in such a way that an electrostatic charge and damage to the machine elements to be sealed off from one another as a result of said electrostatic charge are prevented by the sealing rings.

To solve this problem, it is provided according to a first embodiment that the rubbery elastic material of the sealing ring is electrically conductive.

In this connection, it is advantageous that the machine elements that are to be sealed off from one another by the sealing ring are connected to one another in electrically conductive fashion owning to the electrical conductivity of the sealing ring. An equalization of electric potential between the machine elements is thereby effected. And as a result, mechanical damage to the machine elements resulting from an electrostatic charge of one of the machine elements followed by a dielectric breakdown to the other machine element having a different electric potential is prevented.

In the seal assembly, one of the machine elements is grounded to a specific ground potential (for example, to the body of a motor vehicle as the electric ground potential), so that a potential equalization to the other machine element is produced by the electrically conductive sealing ring.

The sealing ring can comprise at least one dynamically stressed sealing lip and at least one statically stressed seal. The dynamically stressed sealing lip can encompass a shaft to be sealed, for example, and the seal can contact the bored opening in a housing so as to form a seal.

The sealing lip and the seal are preferably embodied as integral and as materially uniform, and are made of the electrically conductive, rubbery elastic material. In such a case, there can be no difference in potential between the machine elements to be sealed off from one another. Once one of the two machine elements has been grounded to a specific ground potential, both machine elements are grounded, thereby reliably preventing a dielectric breakdown between the two machine elements.

In general, it is also possible for the sealing lip and the seal to each be made of an electrically conductive, rubbery elastic material, and to be connected to one another in an electrically conductive manner. The materials of the sealing lip and seal lie adjacent to and in contact with one another, in order to produce the electrically conductive connection between the sealing lip and seal and to achieve the equalization of potential between the machine elements.

To solve the problem, it is provided according to a second embodiment that the buffer seal of the sealing ring is made of an electrically conductive material.

In this case, it is advantageous that the buffer seal of the sealing ring produces an electrically conductive connection between the machine elements to be sealed off from one another, thereby effecting an equalization of electric potential between the machine elements. Consequently, mechanical damage to the machine elements as a result of an electric discharge is prevented.

In the seal assembly, one of the machine elements is grounded, and therefore, the other machine element is also grounded by virtue of the electrically conductive buffer seal of the sealing ring.

In addition to equalizing electric potential, the buffer seal also protects the sealing lip against impingement with contaminants from the surrounding environment.

According to one advantageous embodiment, it can be provided that the buffer seal is made of an electrically conductive non-woven fabric. The buffer seal is therefore air permeable and prevents the formation of disadvantageous pressure differences axially on both sides of the buffer seal, for example, even if the temperatures in the surrounding area and in the space to be sealed change relative to one another.

According to another embodiment, it can be provided that the buffer seal is made of an electrically conductive PTFE material. Such a buffer seal has only very low wear, and as a result, has a particularly long service life. The sealing ring has constantly good performance characteristics over a long lifespan. When the sealing ring is used as intended, minimal initial wear occurs in the region of the contact surface of the buffer seal with the machine element to be sealed. The dynamically stressed contact surface of the buffer seal is then glazed, making it highly resistant to abrasive wear.

If the buffer seal is made of a non-woven fabric, this non-woven fabric can be impregnated with electrically conductive PTFE.

The electrical conductivity of non-woven fabric or PTFE materials can be achieved, e.g., by means of electrically conductive particles, which are arranged distributed in the buffer seal. The material from which the particles are made, the quantity and distribution of the particles in the buffer seal, and the size of the particles are adapted to the respective conditions of the specific application in such a way that an equalization of potential between the two machine elements to be sealed off from one another is achieved through the electrical conductivity of the buffer seal.

The buffer seal can be embodied as circular. Such a buffer seal can be easily and cost-effectively produced, and can be easily completed with the dynamically stressed sealing lip to form a sealing ring. The buffer seal can be connected to the sealing lip, for example, by adhesive connection or interlocking connection.

The sealing lip can be made of an elastomeric material. Elastomeric materials as sealing materials for sealing lips are generally known, wherein the widest range of materials is available for the widest range of applications. For many applications, elastomeric materials can be cost-effectively obtained and easily processed.

A dirt lip can be arranged axially between the sealing lip and the buffer seal. A dirt lip of this type provides additional protection against the penetration of contaminants from the surrounding environment in the direction of the sealing lip. Contaminants that pass through the buffer seal in the direction of the sealing lip are retained by the dirt lip. The buffer seal and the dirt lip are arranged in series connection based upon function.

According to one advantageous embodiment, it can be provided that the dirt lip and the sealing lip transition into one another as an integral piece, and are materially uniform. Production of the sealing ring is thereby simplified.

Depending upon the respective circumstances of the specific application, however, it can also be possible for the dirt lip and the sealing lip to be made of different sealing materials. This allows each of the lips to be individualized in terms of function.

The seal assembly comprises a sealing ring, as described above, wherein the sealing lip and/or the buffer seal are adjacent to and in contact with a surface to be sealed of a first machine element to be sealed, wherein the first machine element to be sealed is arranged adjacent to a second machine element, spaced radially therefrom, wherein the sealing ring is arranged in the gap formed by the radial spacing, wherein the second machine element is grounded, and wherein the first and second machine elements are each adjacent to and in contact with the seal and/or the buffer seal, as a result of which the first machine element and the second machine element are connected to one another in an electrically conductive fashion. With such an electrically conductive connection between the two machine elements, produced by the electrically conductive rubbery elastic material of the sealing ring and/or the buffer seal, an equalization of electric potential between the two machine elements is produced, and mechanical damage to the machine elements as a result of a dielectric breakdown is prevented.

In the seal assembly, one of the machine elements is grounded, and therefore, as a result of the potential equalization, the other machine element is also grounded.

As a result of the electric potential equalization and the grounding of the seal assembly, mechanical damage to the machine elements caused by dielectric breakdowns is prevented.

Without the equalization of electric potential, mechanical damage to the machine elements to be sealed off from one another, caused by dielectric breakdowns, might occur due to the fact that different electric potentials of the machine elements can be compensated for by a disruptive electric discharge. A dielectric breakdown of this type is more probable the closer the machine elements having different electric potentials are located adjacent to one another. Such a dielectric breakdown can effect a removal of material from the machine element with a relatively low charge, and a change in the material structure, in the region in which the dielectric breakdown occurs.

The buffer seal is arranged on the side of the sealing lip that faces axially away from the space to be sealed. In this manner, the buffer seal effects an equalization of potential between the machine elements to be sealed, and the buffer seal also protects the sealing lip from impingement with contaminants from the surrounding environment.

The sealing ring preferably comprises a support element, which is connected in an interlocking manner with the second machine element. A support element of this type is made of a tough, hard material, for example, a metallic sheet, and can be formed in an L-shape. The support element can have an axial projection and a radial projection, wherein the axial projection is pressed into the second machine element and the sealing lip and optionally the dirt lip are fixed on the radial projection. The buffer seal can be connected directly or indirectly to the side of the radial projection that faces axially away from the space to be sealed.

The first machine element can be formed by a drive shaft of an electric motor, and the second machine element can be formed by a housing of a transmission that is connected to the electric motor and encloses the drive shaft. This special use of the seal assembly is particularly advantageous. If the electric motor and the transmission together form a drive unit, then operation of the electric motor ordinarily results in a static charge of individual components of the drive unit, and therefore in differences in potential between components which are not statically charged.

In general, it is possible to implement an equalization of potential between components having different potentials by means of relatively costly structural measures.

In the seal assembly according to the present disclosure, this equalization of potential is achieved by the sealing ring, which has a simple construction and can be easily and cost-effectively produced.

When an electric motor is used as intended, the drive shaft thereof is ordinarily electrostatically charged. The drive shaft of the electric motor extends in a transmission that is connected to the electric motor. Without an equalization of potential, the possibility would exist that a dielectric breakdown between the electrostatically charged drive shaft and components of the transmission might develop, and machine elements of the transmission might become mechanically damaged by the dielectric breakdown. To prevent this, it is provided that the equalization of potential is achieved by means of the sealing rings. The electrostatic charge of the drive shaft is transmitted to the adjoining machine element, which is grounded to a specific ground potential, by means of the electrically conductive rubbery elastic material of the sealing ring and/or by means of the buffer seal of the sealing ring, which is made of an electrically conductive material. As a result, the drive shaft is also grounded.

Because there is no difference in potential between the drive shaft and the adjacent components of the transmission, no dielectric breakdown can occur, which might lead to mechanical damage.

DRAWINGS

Figure 3:
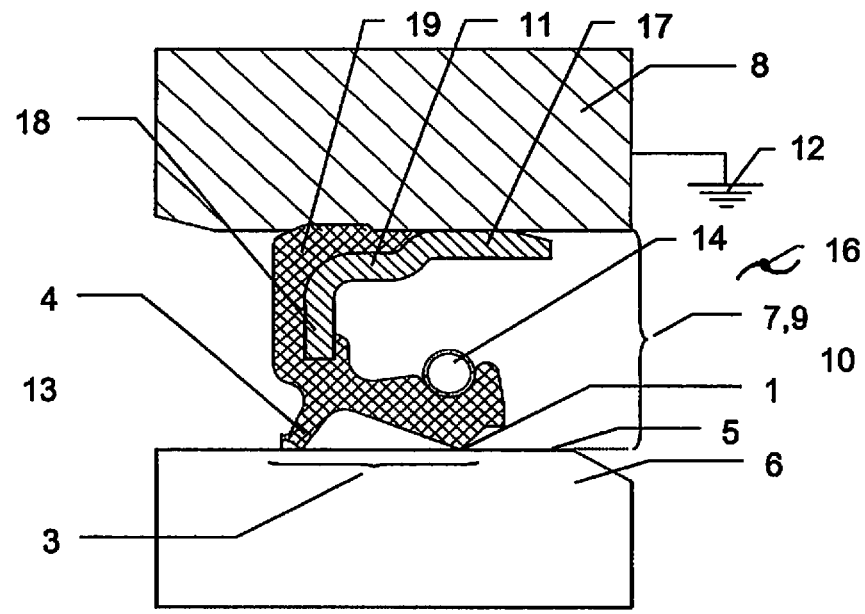
Figure 2:
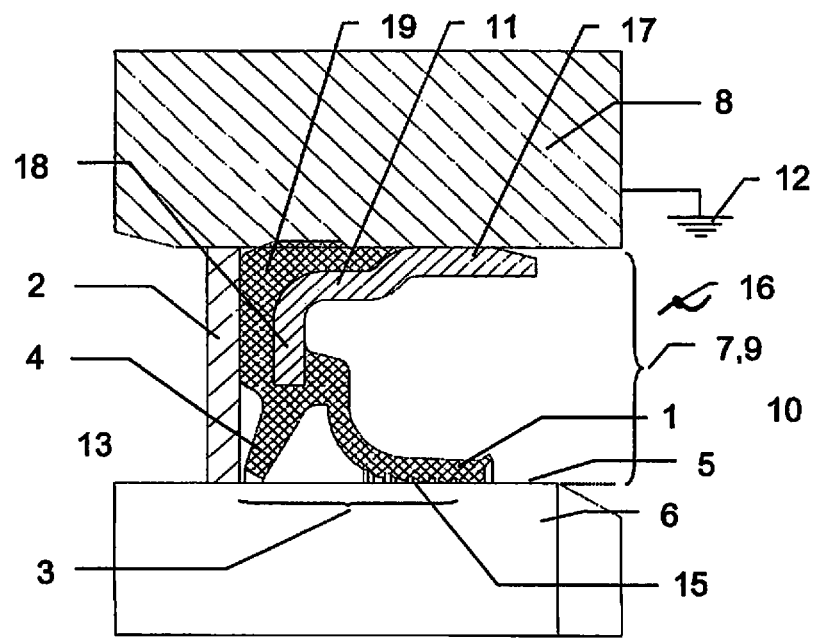

The drawings show:

FIG. 1 is a first embodiment example, in which the sealing ring comprises a buffer seal made of an electrically conductive material, and the sealing lip of the sealing ring is pressed by an annular helical spring against the surface of the first machine element to be sealed, FIG. 2 is a second embodiment example, in which the sealing ring comprises a buffer seal made of an electrically conductive material, and the sealing lip is pressed, without an annular helical spring, solely by virtue of its elastic prestress, in a radial direction against the surface of the first machine element to be sealed, wherein the sealing lip has return rifling for the medium to be sealed off axially in the direction of the space to be sealed, and FIG. 3 is a third embodiment example, similar to the first embodiment example of FIG. 1, in which the rubbery elastic material of the sealing ring is electrically conductive and no buffer seal is provided.

DETAILED DESCRIPTION

In each of FIGS. 1 and 2, a seal assembly is illustrated, which comprises a sealing ring. The sealing ring is arranged within the gap 9 between the first machine element 6 and the second machine element 8, wherein the gap 9 is formed by the radial distance 7.

The first machine element 6 is formed by the drive shaft of an electric motor, and the second machine element 8 is formed by the housing of a transmission, which, together with the electric motor, forms a drive unit.

The sealing ring comprises the sealing lip 1 and the buffer seal 2, wherein the buffer seal 2 is made of an electrically conductive material, in the illustrated embodiment examples, a non-woven material impregnated with PTFE. The buffer seal 2 is formed as a circular disk, and is arranged on the side of the sealing lip 1 that faces axially away from the space 10 to be sealed.

In a radial direction, the buffer seal 2 extends from the surface 5 of the first machine element 6 that is to be sealed, up to the second machine element 8, wherein each of the two machine elements 6, 8 is adjacent to and in contact with the buffer seal 2, and said elements are therefore connected to one another in an electrically conductive manner.

In the embodiment examples illustrated here, the second machine element 8 is provided with a grounding 12, and therefore, the electrically conductive connection of the first machine element 6 to the second machine element 8 by the buffer seal 2 results in a grounding of the first machine element 6 and therefore an equalization of electric potential.

In addition to this equalization of electric potential, the buffer seal 2 further prevents contaminants from the surrounding environment 13 from penetrating to the sealing lip 1.

A dirt lip 4 is arranged axially between sealing lip 1 and buffer seal 2, within the axial distance 3, and in the illustrated embodiment examples is embodied as forming an integral piece with and as made of the same material as the sealing lip 1. The dirt lip 4 and the buffer seal 2 are arranged in series connection on the basis of function, and each prevents contaminants from the surrounding environment 13 from penetrating in an axial direction to the sealing lip 1.

In the two embodiment examples, the support element 11 has a double-bent axial arm 17, wherein the part of the axial arm 17 that faces axially away from the space 10 to be sealed has a relatively narrower outer diameter. In this region, the axial arm 17 is embodied as deflected inward in a radial direction in its transition to radial arm 18, wherein the static seal 19 is arranged in this area of transition, forming a seal against the second machine element 8.

The static seal 19 is embodied as a single integral piece and as materially uniform with the sealing lip 1 and the dirt lip 4.

In general, the electrically conductive buffer seal can be combined with any conventional radial shaft sealing rings.

In FIG. 1, the sealing ring comprises a sealing lip 1, which is pressed in a radial direction by an annular helical spring 14 against the surface 5 of the first machine element 6 to be sealed. This ensures that, even if no relative overpressure referred to the surrounding environment 13 prevails within the space 10 to be sealed, the sealing lip 1 encloses the surface 5 to be sealed with sufficient contact pressure on the side of the outer periphery, forming a seal.

In contrast, FIG. 2 shows a sealing lip 1 of different design. The sealing lip 1 has return rifling 15 on its side that faces the surface 5 to be sealed radially, for returning the medium 16 to be sealed axially in the direction of the space 10 to be sealed.

FIG. 3 shows a third embodiment example of a seal assembly, similar to the first embodiment example of FIG. 1.

However, in the third embodiment example, the electrically conductive connection between the first machine element 6 and the second machine element 8 is achieved not by a buffer seal made of an electrically conductive material, but by the fact that the rubbery elastic material from which the sealing ring is made is electrically conductive.

As in FIG. 1, the sealing ring in this case also comprises an annular helical spring 14, which is enclosed by the dynamically stressed sealing lip 1 on the outer periphery of said spring.

However, in contrast thereto, it is also possible for the annular helical spring to be dispensed with, thereby resulting in a sealing ring similar to the sealing ring of FIG. 2.

The dynamically stressed sealing lip 1 and the statically stressed seal 19 transition into one another as an integral piece, and are embodied as materially uniform, made of an electrically conductive, rubbery elastic material. Differences in potential are equalized in that the second machine element 8 is grounded, and an equalization of potential to the first machine element 6 is accomplished by means of the electrically conductive seal.

LIST OF REFERENCE SIGNS

1 Sealing lip
2 Buffer seal
3 Axial distance between 1 and 2
4 Dirt lip
5 Surface of 6 to be sealed
6 First machine element (shaft)
7 Radial distance between 6 and 8
8 Second machine element (housing)
9 Gap (corresponds to 7)
10 Space to be sealed
11 Support element
12 Grounding
13 Surrounding environment
14 Annular helical spring
15 Return rifling
16 Medium to be sealed
17 Axial arm
18 Radial arm
19 Static seal

The invention claimed is:

1. A sealing assembly, comprising at least one dynamically stressed sealing lip (1) and a buffer seal (2), which is formed as a separate member from the sealing lip and disposed adjacent to the sealing lip (1) at an axial distance (3) therefrom, wherein the buffer seal (2) is made of an electrically conductive material including a non-woven fabric.

2. The sealing assembly according to claim 1, wherein the electrically conductive material of the buffer seal (2) includes PTFE.

3. The sealing assembly according to claim 1, wherein the buffer seal (2) is embodied as circular.

4. The sealing assembly according to claim 1, wherein the sealing lip (1) is made of an elastomeric material.

5. The sealing assembly according to claim 1, wherein a dirt lip (4) is arranged axially between the sealing lip (1) and the buffer seal (2) within the axial distance (3).

6. The sealing assembly according to claim 5, wherein the dirt lip (4) and the sealing lip (1) are embodied as transitioning into one another as a single integral piece and as materially uniform.

* * * * *

UNITED STATES PATENT AND TRADEMARK OFFICE
CERTIFICATE OF CORRECTION

PATENT NO. : 10,161,522 B2
APPLICATION NO. : 13/973329
DATED : December 25, 2018
INVENTOR(S) : Francois Colineau et al.

It is certified that error appears in the above-identified patent and that said Letters Patent is hereby corrected as shown below:

On the Title Page

In the Abstract
Column 2, Line number 11, please delete "the a" and insert --a-- therefor.

Signed and Sealed this
Thirtieth Day of April, 2019

Andrei Iancu
*Director of the United States Patent and Trademark Office*